United States Patent
Vondemkamp et al.

(10) Patent No.: US 8,139,525 B1
(45) Date of Patent: Mar. 20, 2012

(54) CARRIER SELECTION BASED ON TYPE OF PACKET FLOW

(75) Inventors: Bret D. Vondemkamp, Shawnee, KS (US); Andrew M. Wurtenberger, Olathe, KS (US); Rajveen Narendran, Olathe, KS (US); Joseph I. Schield, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 603 days.

(21) Appl. No.: 11/535,870

(22) Filed: Sep. 27, 2006

(51) Int. Cl.
*H04J 3/24* (2006.01)
*H04W 72/00* (2009.01)
*G06F 15/173* (2006.01)

(52) U.S. Cl. ........ 370/329; 370/349; 455/450; 455/453; 709/223

(58) Field of Classification Search .................. 370/329, 370/349, 352, 389, 392, 383, 395, 390, 449, 370/460, 464; 709/223, 224, 500, 527; 455/450, 455/452.2, 453, 552.1
See application file for complete search history.

(56) References Cited

U.S. PATENT DOCUMENTS

| | | | |
|---|---|---|---|
| 5,729,544 A | 3/1998 | Lev et al. | |
| 6,069,871 A | 5/2000 | Sharma et al. | |
| 7,145,890 B1 | 12/2006 | Seo et al. | |
| 7,177,658 B2 | 2/2007 | Willenegger et al. | |
| 7,349,699 B1 | 3/2008 | Kelly et al. | |
| 7,466,719 B2 | 12/2008 | Xu et al. | |
| 2004/0037264 A1* | 2/2004 | Khawand | 370/349 |
| 2004/0125768 A1 | 7/2004 | Yoon et al. | |
| 2005/0059397 A1 | 3/2005 | Zhao | |
| 2006/0014544 A1 | 1/2006 | Tolli | |
| 2006/0019665 A1 | 1/2006 | Aghvami et al. | |
| 2006/0142051 A1* | 6/2006 | Purnadi et al. | 455/552.1 |
| 2006/0160551 A1 | 7/2006 | Matoba et al. | |
| 2007/0053336 A1 | 3/2007 | Petrovic et al. | |
| 2007/0171867 A1 | 7/2007 | Kim | |
| 2009/0016328 A1 | 1/2009 | Peisa | |

OTHER PUBLICATIONS

U.S. Appl. No. 11/532,407, entitled "Carrier Selection Based on Probable Mobility of Packet Flow," filed Sep. 15, 2006 in the name of inventor Andrew M. Wurtenberger et al.
Non-Final Office Action from U.S. Appl. No. 11/532,407, mailed Apr. 2, 2009.
Non-Final Office Action from U.S. Appl. No. 11/532,407, mailed Nov. 6, 2009.
Final Office Action from U.S. Appl. No. 11/532,407, mailed May 13, 2010.
Advisory Action mailed Jul. 23, 2010 in U.S. Appl. No. 11/532,407.
Panel Decision mailed Aug. 24, 2010 in U.S. Appl. No. 11/532,407.
Non-Final Office Action from U.S. Appl. No. 11/532,407, mailed Oct. 27, 2010.
Non-Final Office Action from U.S. Appl. No. 11/532,407, mailed May 10, 2011.
Final Office Action mailed Oct. 25, 2011 for U.S. Appl. No. 11/532,407.

* cited by examiner

*Primary Examiner* — Kwang B Yao
*Assistant Examiner* — Adam Duda

(57) ABSTRACT

Methods and systems are provided for carrier selection based on type of packet flow. Service is provided to access terminals on a plurality of carriers in a wireless coverage area. A request is received from a first access terminal. The request indicates that the first access terminal is requesting a packet flow, and the request comprises a packet-flow-type indication. It is determined whether the packet-flow-type indication is associated with an expedited-forwarding quality of service (QoS). If the packet-flow-type indication is associated with an expedited-forwarding QoS, it is further determined that, among the plurality of carriers, a first carrier has the fewest ongoing packet flows having the packet-flow-type indication; responsively, the first access terminal is instructed to conduct the requested packet flow on the first carrier.

19 Claims, 4 Drawing Sheets

| | PROFILE ID | QUALITY OF SERVICE |
|---|---|---|
| 201 | PROFILE_ID_1 | EXPEDITED FORWARDING |
| 202 | PROFILE_ID_2 | NON-EXPEDITED FORWARDING |
| 203 | PROFILE_ID_3 | EXPEDITED FORWARDING |
| 204 | PROFILE_ID_4 | EXPEDITED FORWARDING |
| 205 | PROFILE_ID_5 | NON-EXPEDITED FORWARDING |

CORRELATION DATA 200

CARRIER SELECTION BASED ON TYPE OF PACKET FLOW

BACKGROUND

1. Technical Field

The present invention relates to wireless communications, and, more particularly, to assignment of carrier frequencies to access terminals for conducting packet flows.

2. Description of Related Art

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid access terminals, can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a base station controller (BSC) in 1x networks. The access node also includes one or more base transceiver stations (BTSs) or "Node-Bs," each of which include one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, an access terminal may communicate over the packet-data network via the access node and the PDSN.

In addition to VoIP communication, access terminals frequently engage in other types of packet-data communication, such as instant messaging (IM) and web browsing. Each instance of an access terminal engaging in a type of packet-data communication for a period of time may be deemed a "packet flow," which would typically involve Internet Protocol (IP) packets being sent and received by the access terminal. For example, a given VoIP call may be referred to as a VoIP packet flow. Thus, as examples, an access terminal may engage in VoIP packet flows, IM packet flows, push-to-talk (PTT) packet flows, streaming-video packet flows, streaming-audio packet flows, video-telephony packet flows, and best-effort packet flows such as web-browsing packet flows and file-transfer-protocol (FTP) packet flows.

To address the fact that access terminals engage in these various types of packet flows, a particular revision of EV-DO specifications, known as EV-DO Rev. A ("EV-DO-A"), provides for what are known as profile IDs, which are identifiers associated on a one-to-one basis with types of packet flows. Thus, one profile ID may be associated with VoIP packet flows (i.e., "conversational voice"), while another may be associated with best-effort packet flows, and so on. Again, an access terminal may be able to communicate according to more than one profile ID, reflecting that it can engage in more than one type of packet flow.

To initiate connectivity, when powered on in a coverage area of an access node, an access terminal may send what is known as a Universal Access Terminal Identifier (UATI) request to the access node. The access node may respond by granting a UATI to the access terminal in a message known as a UATI response. This UATI response typically contains the granted UATI, which then serves to identify the access terminal to the access node for some period of time.

After acquiring a UATI, the access terminal will typically communicate with the access node over the air interface to set up what is referred to as a "session." Essentially, an access terminal that has a session with an access node can engage in packet-data communication over the packet-data network to which the access node and the PDSN provide access. Conversely, an access terminal that does not have a session with an access node can not engage in packet-data communication over the packet-data network.

As part of setting up the session, the access terminal sends a connection request to the access node, requesting an air-interface connection. The access node will responsively work to establish the air-interface connection with the access terminal, which involves the access node instructing the access terminal to communicate with the access node over what is known as a traffic channel. This traffic channel takes the form of particular timeslots on the forward link, during which the access node sends data to the access terminal, and a particular CDMA channel on the reverse link, over which the access terminal sends data to the access node.

In addition to establishing the connection with the access terminal, the access node takes a number of other actions, one of which is to validate that the access terminal is authorized to engage in communication via the access node. Another such action is to set up a radio-packet (e.g., A10/A11) connection between the access node and the PDSN for the access terminal. The access node also facilitates establishment of a data link (e.g., a point-to-point protocol (PPP) connection) between the access terminal and the PDSN. The access node may also facilitate assignment (e.g., by the PDSN or by a Mobile-IP home agent) of an IP address to the access terminal. Finally, the access terminal and the access node negotiate over the traffic channel to agree on a set of profile IDs for the access terminal to use during the session; in other words, they agree as to the types of packet flows in which the access terminal is capable of engaging and in which the access terminal is permitted to engage.

Once those steps are complete, the access terminal has a session with the access node, and can therefore communicate over the packet-data network via the access node and the PDSN, according to the agreed-upon set of profile IDs. Typically, the air-interface connection is then torn down, freeing up those resources for other access terminals. Both the network and the access terminal maintain data pertaining to the rest of what was established, however, including the IP address, radio-packet connection, and data link. This transition from having a traffic channel to not having one is referred to as the access terminal going from active to dormant.

Thereafter, if the access terminal wants to initiate packet-data communication, it will send another connection request to the access node, which will again assign a traffic channel to the access terminal. If, on the other hand, the access node receives data addressed to the access terminal, the access node would typically send a page to the access terminal over a common paging channel, which takes the form of certain timeslots on the forward link. Perhaps in that page, or in an ensuing message, the access node will assign a traffic channel to the access terminal. The access terminal can then engage in one or more packet flows of any of the negotiated types, over the packet-data network, using the assigned traffic channel, as well as the previously-established IP address, radio-packet connection, and data link.

As part of setting up a packet flow, either the access terminal or the access node, or both, may send the other a message known as a ReservationOnRequest (RoR), which includes at least one profile ID, indicating the type of packet flow that is being requested. Once an RoR has been sent and acknowledged, the access terminal has an "open reservation" on the traffic channel, associated with the profile ID that was included in the RoR; in other words, the open reservation is associated with the type of packet flow in which the access terminal is then able to engage. An access terminal may have multiple open reservations on the traffic channel, corresponding to the fact that the access terminal can engage in multiple packet flows at one time.

The network typically uses this profile-ID information to apply a particular quality of service (QoS) to the packet flow, which essentially means providing a particular level of packet forwarding (or "expedited forwarding") treatment to certain packet flows. This traffic shaping is also known as "DiffServ" ("differentiated services"). Thus, a profile ID effectively represents a set of QoS characteristics to be applied to a packet flow.

Note that an access node may, in a coverage area such as a cell or sector, provide service on one or more carrier frequencies ("carriers"). When service is provided on only one carrier, the access terminal will, by default, conduct its one or more packet flows on a traffic channel on that carrier. When service is provided on more than one carrier, the access node will select one of those carriers on which to assign a traffic channel to the access terminal. In general, each carrier may occupy a 1.25-MHz-wide band of the RF spectrum. Furthermore, a carrier may actually be a pair of 1.25-MHz-wide bands, in systems that use a frequency-division-duplex (FDD) approach, where access terminals receive on one frequency, and transmit on another.

SUMMARY

Methods and systems are provided for carrier selection based on type of packet flow. In accordance with one aspect of the invention, an exemplary embodiment may take the form of a method. In accordance with the method, service is provided to access terminals on a plurality of carriers in a wireless coverage area. A request is received from a first access terminal. The request indicates that the first access terminal is requesting a packet flow, and the request comprises a packet-flow-type indication. It is determined whether the packet-flow-type indication is associated with an expedited-forwarding quality of service (QoS). If the packet-flow-type indication is associated with an expedited-forwarding QoS, it is further determined that, among the plurality of carriers, a first carrier has the fewest ongoing packet flows having the packet-flow-type indication. Responsively, the first access terminal is instructed to conduct the requested packet flow on the first carrier.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
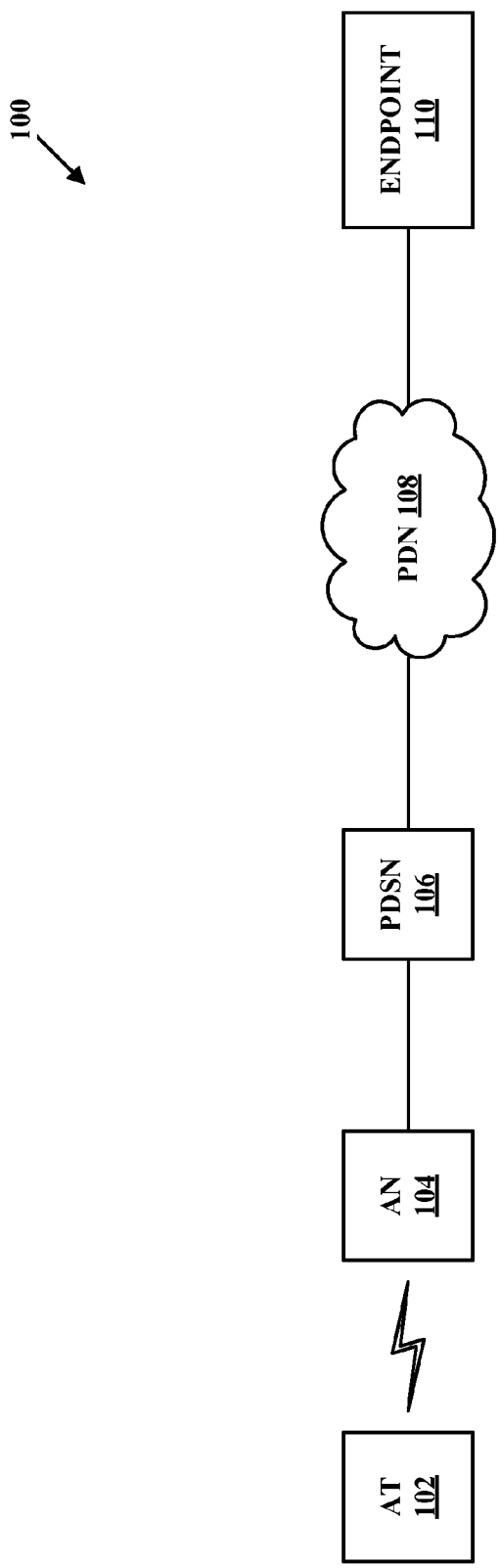
FIG. 1 is a simplified block diagram of a communication system, in accordance with exemplary embodiments.

Some types of packet flows conducted by access terminals require a "higher" QoS than do other types of packet flows. That is, there are latency-sensitive packet flows, such as VoIP packet flows, that require a QoS that involves expedited (i.e., prioritized) forwarding of packets, and there are latency-tolerant packet flows, such as best-effort packet flows (e.g., web-browsing packet flows), for which expedited forwarding of packets is not necessary. Furthermore, in a situation where a given access node is providing service to access terminals on multiple carriers, certain advantages can be attained by intermingling latency-sensitive and latency-tolerant packet flows on each carrier, thus spreading latency-sensitive packet flows among the several carriers.

Thus, a service provider may classify certain types of packet flows as being associated with an expedited-forwarding QoS, while classifying other types of packet flows as not being associated with an expedited-forwarding QoS. The service provider may further configure its access node (and perhaps specifically the RNC) to store—or at least have access to—data that correlates different types of packet flows (e.g., different profile IDs) with either an expedited-forwarding QoS or a non-expedited-forwarding QoS. And certainly profile IDs could be more finely classified according to associated levels of QoS.

As such, when an access node receives a request (e.g., an RoR) from an access terminal that is seeking to establish a packet flow with one or more other entities, the access node may examine the RoR and identify that it contains a profile ID that indicates the type of packet flow in which the access terminal would like to engage. In accordance with the present invention, the access node determines, perhaps with reference to correlation data such as that described above, whether or not that type of packet flow is associated with an expedited-forwarding QoS.

As stated, the access node provides service on more than one carrier in the coverage area (e.g., cell or sector) in question. In accordance with the present invention, if the access terminal is requesting a packet flow that is associated with an expedited-forwarding QoS, the access node instructs the access terminal to conduct that packet flow on whichever carrier in that coverage area currently has the lowest number of ongoing packet flows that have that same profile ID. As an example, the access node may instruct the access terminal to conduct the packet flow on whichever carrier currently has the fewest number of open reservations associated with the profile ID that is included in the request that is being processed. In some embodiments, the access node may instruct the access terminal to conduct the packet flow on whichever carrier currently has the fewest number of open reservations associated with expedited-forwarding profile IDs as a general matter, regardless of those profile IDs' specific values.

If, on the other hand, the access terminal is requesting a packet flow that is not associated with an expedited-forwarding QoS, the access node may instruct the access terminal to conduct that packet flow on any one of the carriers on which the access node provides service in the coverage area. That is, the access node may apply some other carrier-assignment algorithm that may be used when an expedited-forwarding QoS is not needed. In general, the access node may instruct the access terminal as to which carrier to use for the packet flow using a message such as a channel-assignment message.

The present invention thus places packet flows, such as VoIP or streaming-video, that have more stringent throughput and latency requirements—in other words, that require an expedited-forwarding QoS—on carriers that, at the time of packet-flow initiation, have the fewest number of these types of packet flows. Over time, this will spread high-priority packet flows in an equitable manner among the available carriers in a coverage area, making it less likely that too many high-priority packet flows are assigned to the same carrier, which could result in users experiencing problems, such as poor voice quality, due to lack of capacity.

As an example, if too many VoIP packet flows are assigned to a particular carrier, there may not be enough forward-link timeslots to avoid users experiencing choppiness, since, in the VoIP context, packets that are not delivered on time are dropped, resulting in a user hearing gaps in the audio. Essentially, it might not be possible to prioritize all of the VoIP packet flows on that carrier. On the other hand, lower-priority packet flows, such as best-effort packet flows, should not be disadvantaged by being placed on any particular carrier, as those packet flows are not particularly latency-sensitive or throughput-sensitive.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node (AN) 104, a PDSN 106, a packet-data network (PDN) 108, and an endpoint 110. Note that additional entities not depicted in FIG. 1 could be present as well. As an example, there could be more than one access terminal in communication with access node 104; furthermore, there could be additional entities in communication with PDN 108. Also, there could be one or more devices and/or networks making up at least part of one or more of the communication links depicted in FIG. 1. As an example, there could be one or more routers, switches, or other devices or networks on the link between PDSN 106 and PDN 108.

Access terminal 102 may be any mobile device arranged to carry out the access-terminal functions described herein. As such, access terminal 102 may include a user interface, a wireless-communication interface, a processor, and data storage comprising instructions executable by the processor for carrying out the access-terminal functions described herein. The user interface may include buttons, a touch-screen, a microphone, and/or any other elements for receiving inputs from users, as well as a speaker, one or more displays, and/or any other elements for communicating outputs to users.

The wireless-communication interface may comprise an antenna and a chipset for communicating with one or more access nodes over an air interface. As an example, the chipset could be one suitable for engaging in EV-DO (perhaps EV-DO-A) communications. The chipset or wireless-communication interface in general may also be able to communicate with a CDMA network, a Wi-Fi (IEEE 802.11) network, and/or one or more additional types of wireless networks. The processor and data storage may be any suitable components known to those of skill in the art. As examples, access terminal 102 could be or include a cell phone, a personal digital assistant (PDA), a computer, a laptop computer, a hybrid IS-2000/IS-856 device, and/or a multi-mode Wi-Fi/cellular device.

Access node 104 may be any one or any combination of network elements arranged to carry out the access-node functions described herein. As such, access node 104 may include a communication interface, a processor, and data storage comprising instructions executable by the processor to carry out the access-node functions described herein. The communication interface may include one or more antennas and chipsets or other components for providing one or more EV-DO coverage areas such as cells or sectors, for communicating with access terminals such as access terminal 102 over an air interface. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs).

Figure 2:
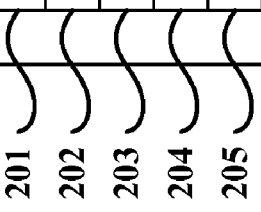
FIG. 2 is a simplified block diagram of correlation data, in accordance with exemplary embodiments.

Furthermore, access node 104 may store correlation data such as that depicted in FIG. 2, in which correlation data 200 is depicted as a table having five rows, 201-205. Each row correlates a respective profile ID with either an expedited-forwarding QoS or rather with a non-expedited-forwarding QoS. Row 201 includes "PROFILE_ID_1" correlated with an expedited-forwarding QoS. Row 202 includes "PROFILE_ID_2" correlated with a non-expedited-forwarding QoS. Row 203 includes "PROFILE_ID_3" correlated with an expedited-forwarding QoS. Row 204 includes "PROFILE_ID_4" correlated with an expedited-forwarding QoS. Row 205 includes "PROFILE_ID_5" correlated with a non-expedited-forwarding QoS.

Returning to FIG. 1, PDSN 106 may be any networking server or other device arranged to carry out the PDSN functions described herein. As such, PDSN 106 may include a communication interface, a processor, and data storage comprising instructions executable by the processor for carrying out the PDSN functions described herein. The communication interface may include a wired packet-data interface such as an Ethernet interface for communicating with access node 104 and over PDN 108. Note that PDSN 106 may, instead or in addition, comprise a wireless-communication interface for communicating with PDSN 106 and over PDN 108. Note as well that PDSN 106 may use the same interface or separate interfaces for communicating with access node 104 and for communicating over PDN 108.

PDN 108 may include one or more wide area networks, one or more local area networks, one or more public networks such as the Internet, one or more private networks, one or more wired networks, one or more wireless networks, and/or one or more networks of any other variety. Devices in communication with PDN 108 may exchange data using a packet-switched protocol such as IP, and may be identified by an address such as an IP address.

Endpoint 110 may be any device arranged to engage in one or more packet flows with access terminal 102 via PDN 108, PDSN 106, and access node 104, and to carry out the endpoint functions described herein. As such, endpoint 110 may include a communication interface, a processor, and data storage comprising instructions executable by the processor for carrying out the endpoint functions described herein. As examples, endpoint 110 could be or include a packet-based telephone, a computer, an access terminal, a cell phone, a PDA, a server (such as a call server, a VoIP server, a PTT server, a proxy (such as a Session Initiation Protocol (SIP) proxy))), and/or any other type of endpoint.

3. Exemplary Operation a. A First Exemplary Method

Figure 3:
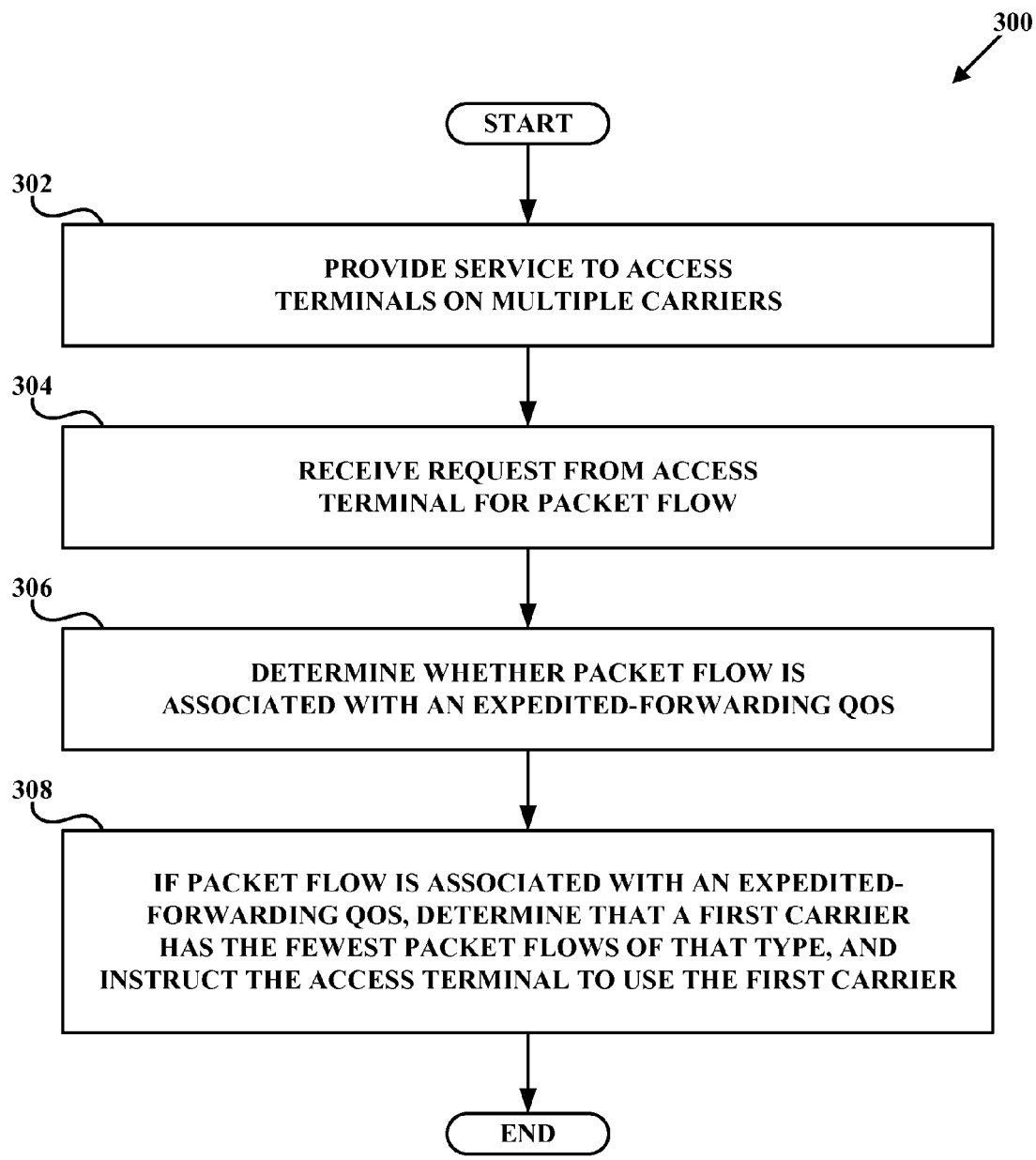
FIG. 3 is a flowchart of a method, in accordance with exemplary embodiments.

FIG. 3 depicts a flowchart of an exemplary method, in accordance with an exemplary embodiment. As shown in FIG. 3, method 300 begins at step 302, when access node 104 provides service to access terminals on a plurality of carriers in a wireless coverage area. At step 304, access node 104 receives a request from access terminal 102, the request indicating that access terminal 102 is requesting a packet flow, and comprising a packet-flow-type indication.

At step 306, access node 104 determines whether the packet-flow-type indication is associated with an expedited-forwarding QoS. At step 308, if the packet-flow-type indication is associated with an expedited-forwarding QoS, access node 104 further determines that, among the multiple carriers, a first carrier has the fewest ongoing packet flows having the packet-flow-type indication, and access node 104 responsively instructs access terminal 102 to conduct the requested packet flow on that carrier. These steps are explained in the following subsections.

And it should be noted that, although method 300 is described herein as being carried out by access node 104, this is not required. In some embodiments, method 300 may be carried out specifically by an RNC or BTS. In other embodiments, method 300 could be carried out by one or more servers, a gateway, a proxy, a BSC, a PDSN, some other network element, or perhaps some combination of these. And other possibilities exist as well.

i. Provide Service to Access Terminals on Multiple Carriers

At step 302, access node 104 provides service to access terminals on multiple carriers in a wireless coverage area. As examples, the wireless coverage area could be a cell or sector. Furthermore, the service that access node 104 provides to access terminals in that wireless coverage area could be EV-DO service, and perhaps, more specifically, EV-DO-A service.

ii. Receive Packet-Flow Request from Access Terminal

At step 304, access node 104 receives a request from access terminal 102. The request could be or include a connection request, an RoR, and/or any other type of message. Whatever form the request takes, it will include a packet-flow-type indication, and indicate that access terminal 102 is requesting a packet flow. In a preferred embodiment, access terminal 102 and access node 104 communicate with each other according to EV-DO-A, and the packet-flow-type indication is a profile ID, as described herein.

Note that, as described, access terminal 102 and access node 104 would have negotiated to establish a set of profile IDs in which access terminal 102 is capable of engaging and permitted to engage. Access terminal 102 is then associated with one or more profile IDs. Thus, when the profile ID provided in the request of step 304 is in that negotiated set of profile IDs, access terminal 102 and access node 104 have effectively negotiated to establish that access terminal 102 is capable of engaging in—and permitted to engage in—the requested packet flow.

Note as well that the inclusion of a given profile ID in the request may itself be the indication that access terminal 102 is requesting a packet flow of that type. The request could, however, include another way of indicating that access terminal 102 is requesting a packet flow in general. Furthermore, the packet-flow-type indication (e.g., profile ID) could indicate that the requested packet flow is of any type, some examples including a VoIP packet flow, a PTT packet flow, a high-performance push-to-talk (HPPTT) packet flow, a streaming-video packet flow, a streaming-audio packet flow, a video-telephony packet flow, a best-effort packet flow, a web-browsing packet flow, and an FTP packet flow.

iii. Determine Whether Packet Flow is Associated with an Expedited-Forwarding QoS At step 306, access node 104 determines whether the packet-flow-type indication is associated with an expedited-forwarding QoS. In one embodiment, access node 104 may carry out step 306 at least in part by referencing correlation data—such as correlation data 200 of FIG. 2—that correlates each of a plurality of packet-flow types with a particular QoS. Thus, for example, if the request of step 304 includes PROFILE_ID_1, access node 104 may reference row 201, and determine that PROFILE_ID_1 is associated with an expedited-forwarding QoS. As another example, if the request includes PROFILE_ID_5, access node 104 may reference row 205, and determine that PROFILE_ID_5 is not associated with an expedited-forwarding QoS.

Note that another way to phrase this latter determination is to say that PROFILE_ID_5 is associated with a non-expedited-forwarding QoS. In general, it could be the case that some profile IDs are associated with an expedited-forwarding QoS, which generally means that packets associated with packet flows having those profile IDs receive prioritized packet-forwarding treatment, while some profile IDs are simply not associated with such expedited forwarding. However, it could also be the case that some profile IDs are explicitly associated with a baseline (e.g., best efforts) QoS. And there is no need to have only two categories of QoS (such as expedited-forwarding and non-expedited-forwarding). Each of any number of levels of QoS could be associated with any one or any set of profile IDs.

iv. If Packet Flow is Associated with an Expedited-Forwarding QoS, Determine that a First Carrier Has the Fewest Packet Flows of that Type, and Instruct the Access Terminal to Use the First Carrier At step 308, if it is determined at step 306 that the packet-flow-type indication is associated with an expedited-forwarding QoS, access node 104 determines that, among the multiple carriers on which access node 104 provides service in the wireless coverage area in question, a first carrier has the fewest ongoing packet flows having the packet-flow-type indication from the request of step 304. Access node 104 responsively instructs access terminal 102 to conduct the requested packet flow on the first carrier.

Using profile IDs as exemplary packet-flow-type indications, access node 104 may determine that the first carrier has the fewest ongoing packet flows having the profile ID associated with this requested packet flow at least in part by determining that the first carrier has the fewest open reservations having that profile ID. Access node 104 may then instruct access terminal 102 to conduct the requested packet flow on the first carrier by sending a channel-assignment message to access terminal 102.

Note that, if the packet-flow-type indication (e.g., profile ID) is not associated with an expedited-forwarding QoS, access node 104 may instruct access terminal 102 to conduct the packet flow on any carrier. Thus, access node 104 may use some other carrier-assignment algorithm to choose which carrier to instruct access terminal 102 to use. Thus, access node 104 may instruct access terminal 102 to use the first carrier mentioned herein, or any other carrier.

b. A Second Exemplary Method

Figure 4:
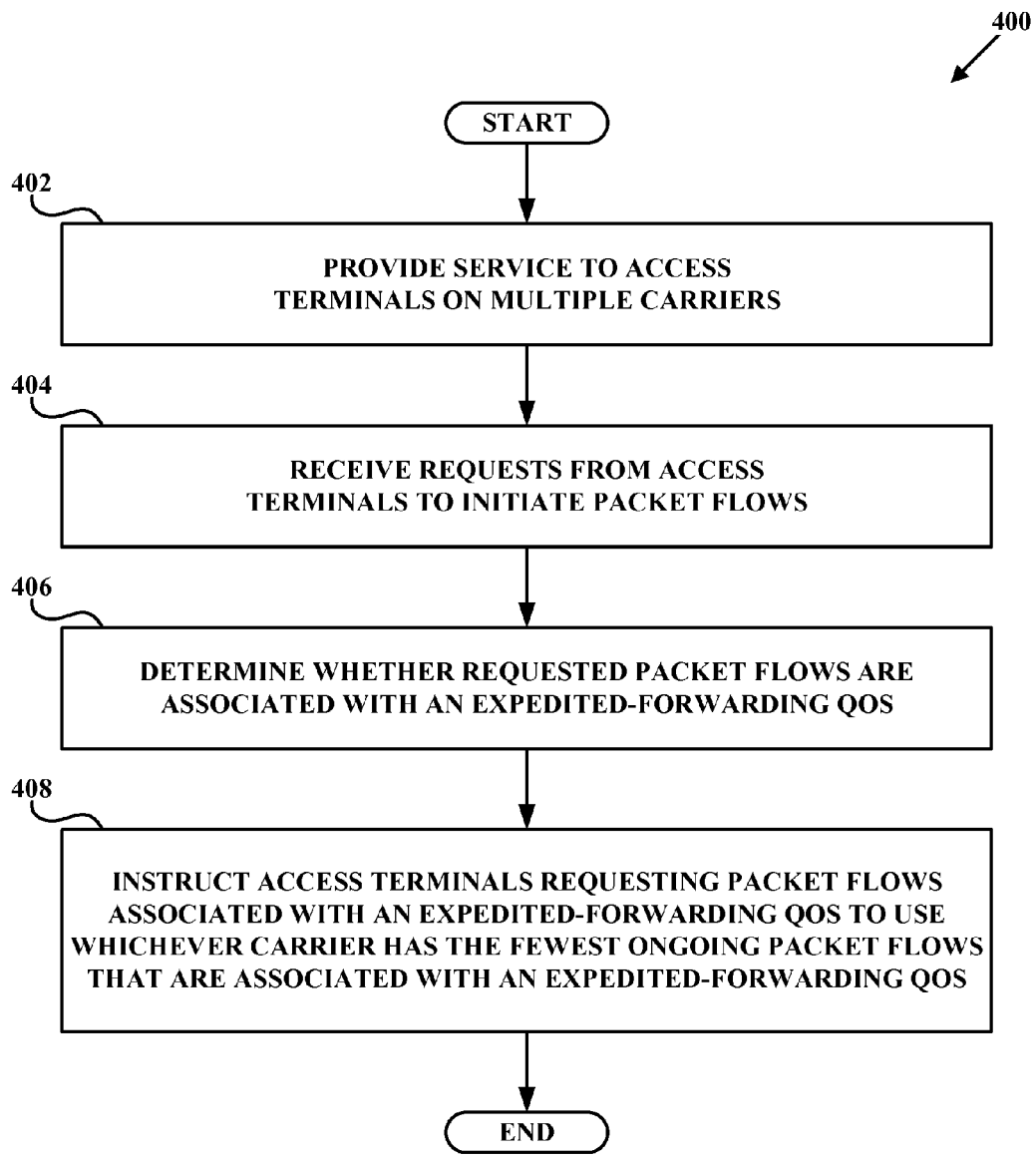
FIG. 4 is a flowchart of a method, in accordance with exemplary embodiments.

FIG. 4 is a flowchart of an exemplary method, in accordance with an exemplary embodiment. As with method 300 of FIG. 3, method 400 of FIG. 4 is described as being carried out by an access node, and by access node 104 of FIG. 1 in particular, though this is not required. Method 400 could be carried out by any one or any combination of the entities described as possibilities for carrying out method 300, and/or any other entity or entities.

As shown in FIG. 4, a method 400 begins at step 402, when access node 104 provides service to access terminals on a plurality of carriers in a wireless coverage area, as described herein. As an example, this service could be or include EV-DO-A service. At step 404, access node 104 receives, from access terminals such as access terminal 102, requests to initiate packet flows. These requests could be or include connection requests, RoRs, and/or any other type of messages according to any protocols now known or later developed. At step 406, access node 104 respectively determines whether the requested packet flows are of a type associated with an expedited-forwarding QoS. Access node 104 may carry out step 406 by referring, on a request-by-request basis, to correlation data such as correlation data 200.

At step 408, access node 104 respectively instructs, perhaps using channel-assignment messages, the access terminals requesting packet flows of a type associated with an expedited-forwarding QoS to conduct those packet flows on whichever carrier, among the plurality of carriers, has the fewest ongoing packet flows at that time that are of a type associated with an expedited-forwarding QoS. Note that packet flows at varying levels of QoS could be included in the category of "packet flows of a type associated with an expedited-forwarding QoS."

Thus, in accordance with method 400, among other advantages, the advantages described herein with respect to spreading packet flows associated with an expedited-forwarding QoS relatively evenly across multiple provided carriers may be realized.

4. Conclusion

Various exemplary embodiments have been described above. Those skilled in the art will understand, however, that changes and modifications may be made to those examples without departing from the scope of the claims.

What is claimed is:

1. A method comprising:
providing service to access terminals on a plurality of carriers in a wireless coverage area;
receiving a request from a first access terminal, the request indicating that the first access terminal is requesting a packet flow, the request comprising a packet-flow-type indication, wherein packet-flow-type indications are associated on a one-to-one basis with types of application-layer data carried by respective packet flows;
determining whether the packet-flow-type indication is associated with an expedited-forwarding quality of service (QoS); and
if the packet-flow-type indication is associated with an expedited-forwarding QoS, further determining that, among the plurality of carriers, a first carrier has the fewest ongoing packet flows having the packet-flow-type indication, and responsively instructing the first access terminal to conduct the requested packet flow on the first carrier.

2. The method of claim 1, carried out by at least one of an Evolution Data Optimized (EV-DO) radio network controller (RNC), an EV-DO access node (AN), and an EV-DO base transceiver station (BTS).

3. The method of claim 1, wherein the request comprises at least one of a connection request and a reservation on request (RoR).

4. The method of claim 1, wherein the first access terminal is a device selected from the group consisting of a cell phone, a personal digital assistant, a computer, a laptop computer, a hybrid IS-2000/IS-856 device, and a multi-mode Wi-Fi/cellular device.

5. The method of claim 1, wherein the packet-flow-type indication is a profile ID.

6. The method of claim 1, wherein the packet-flow-type indication indicates that the packet flow is of a type selected from the group consisting of a Voice over Internet Protocol (VoIP) packet flow, a push-to-talk (PTT) packet flow, a high-performance push-to-talk (HPPTT) packet flow, a streaming-video packet flow, a streaming-audio packet flow, a video-telephony packet flow, a best-effort packet flow, a web-browsing packet flow, and a file transfer protocol (FTP) packet flow.

7. The method of claim 1, wherein determining whether the packet-flow-type indication is associated with an expedited-forwarding QoS comprises referencing correlation data that correlates each of a plurality of packet-flow types with a particular QoS.

8. The method of claim 1, wherein determining that the first carrier has the fewest ongoing packet flows having the packet-flow-type indication comprises determining that the first carrier has the fewest open reservations having the packet-flow-type indication.

9. The method of claim 1, wherein instructing the first access terminal to conduct the requested packet flow on the first carrier comprises sending a channel-assignment message to the first access terminal.

10. The method of claim 1, further comprising negotiating with the first access terminal to establish that the first access terminal is capable of engaging in the requested packet flow and that the first access terminal is permitted to engage in the requested packet flow.

11. The method of claim 1, further comprising:
if the packet-flow-type indication is not associated with an expedited-forwarding QoS, instructing the first access terminal to conduct the requested packet flow on a second carrier, wherein the second carrier is either the first carrier or a different carrier.

12. An access node comprising:
a communication interface;
a processor; and
data storage comprising instructions executable by the processor to:
provide service to access terminals on a plurality of carriers in a wireless coverage area;
receive a request from a first access terminal, the request indicating that the first access terminal is requesting a packet flow, the request comprising a packet-flow-type indication, wherein packet-flow-type indications are associated on a one-to-one basis with types of application-layer data carried by respective packet flows;
determine whether the packet-flow-type indication is associated with an expedited-forwarding quality of service (QoS); and
if the packet-flow-type indication is associated with an expedited-forwarding QoS, further determine that, among the plurality of carriers, a first carrier has the fewest ongoing packet flows having the packet-flow-type indication, and responsively instruct the first access terminal to conduct the requested packet flow on the first carrier.

13. The access node of claim 12, wherein the access node is an Evolution Data Optimized (EV-DO) access node, and wherein the access terminals are EV-DO access terminals.

14. The access node of claim 12, wherein the request comprises at least one of a connection request and a reservation on request (RoR).

15. The access node of claim 12, wherein the packet-flow-type indication is a profile ID.

16. The access node of claim 12, wherein the packet-flow-type indication indicates that the packet flow is of a type selected from the group consisting of a Voice over Internet Protocol (VoIP) packet flow, a push-to-talk (PTT) packet flow, a high-performance push-to-talk (HPPTT) packet flow, a streaming-video packet flow, a streaming-audio packet flow, a video-telephony packet flow, a best-effort packet flow, a web-browsing packet flow, and a file transfer protocol (FTP) packet flow.

17. The access node of claim 12, wherein the instructions to determine whether the packet-flow-type indication is associated with an expedited-forwarding QoS comprise instructions to reference correlation data that correlates each of a plurality of packet-flow types with a particular QoS.

18. The access node of claim 12, wherein the instructions to determine that the first carrier has the fewest ongoing packet flows having the packet-flow-type indication comprise instructions to determine that the first carrier has the fewest open reservations having the packet-flow-type indication.

19. The access node of claim 12, wherein the data storage further comprises instructions to:
if the packet-flow-type indication is not associated with an expedited-forwarding QoS, instruct the first access terminal to conduct the requested packet flow on a second carrier, wherein the second carrier is either the first carrier or a different carrier.

* * * * *